United States Patent
Oh et al.

(10) Patent No.: US 7,682,584 B2
(45) Date of Patent: Mar. 23, 2010

(54) CERIUM CARBONATE POWDER, CERIUM OXIDE POWDER, METHOD FOR PREPARING THE SAME, AND CMP SLURRY COMPRISING THE SAME

(75) Inventors: Myoung Hwan Oh, Daejeon (KR); Jun Seok Nho, Daejeon (KR); Jong Pil Kim, Daejeon (KR); Jang Yul Kim, Daejeon (KR); Seung Beom Cho, Daejeon (KR)

(73) Assignee: LG Chem, Ltd., Seoul (KR)

(*) Notice: Subject to any disclaimer, the term of this patent is extended or adjusted under 35 U.S.C. 154(b) by 517 days.

(21) Appl. No.: 11/598,100

(22) Filed: Nov. 13, 2006

(65) Prior Publication Data

US 2007/0107318 A1 May 17, 2007

(30) Foreign Application Priority Data

Nov. 14, 2005 (KR) .................. 10-2005-0108721

(51) Int. Cl.
*C01F 17/00* (2006.01)
(52) U.S. Cl. ..................................... 423/263
(58) Field of Classification Search ............... 423/263; 51/307, 309; 106/3
See application file for complete search history.

(56) References Cited

U.S. PATENT DOCUMENTS

| | | | |
|---|---|---|---|
| 4,497,785 A | 2/1985 | Tilley et al. | |
| 6,372,003 B1 | 4/2002 | Kasai et al. | |
| 6,811,758 B1 * | 11/2004 | Pickering et al. | 423/21.1 |
| 6,887,289 B2 | 5/2005 | Ota et al. | |

FOREIGN PATENT DOCUMENTS

| | | |
|---|---|---|
| CN | 1071144 A | 4/1993 |
| CN | 1361064 A | 7/2002 |
| CN | 1368529 A | 9/2002 |
| EP | 0 654 445 A1 | 5/1995 |
| EP | 1 205 965 B1 | 5/2002 |
| JP | 07-172826 A | 7/1995 |
| JP | 2000-159521 A | 6/2000 |
| KR | 1998-081812 A | 11/1998 |
| KR | 10-2000-0069823 A | 11/2000 |
| WO | WO 98/14987 A1 | 4/1998 |
| WO | WO 99/31195 A1 | 6/1999 |

OTHER PUBLICATIONS

Translation of China 1368529A, Sep. 2002.*
Machine translation of Korea 1998-081812A, Nov. 1998.*
Machine translation of Japan 2000-159521A, Jun. 2000.*
Translation of Japan 07-172826A, Jul. 1995.*

* cited by examiner

*Primary Examiner*—Steven Bos
(74) *Attorney, Agent, or Firm*—McKenna Long & Aldridge LLP

(57) ABSTRACT

Method of preparing cerium carbonate powder by mixing a cerium precursor solution with a carbonate precursor solution and subjecting the mixture solution to a precipitation reaction, wherein the concentration of cerium in the cerium precursor solution ranges from 1M to 10M, the molar concentration ratio of the cerium precursor to the carbonate precursor ranges from 1:1 to 1:7, and the cerium precursor solution contains at least one additive selected from the group consisting of carbonate compounds, acrylic compounds, and sulfate ion-containing compounds. The cerium carbonate powder has an orthorhombic crystal structure, a particle size of 0.05 to 1 µm, and an aspect ratio of 1 to 5. Moreover, disclosed are cerium oxide powder prepared from said cerium carbonate powder as a precursor, a preparation method thereof, and a CMP slurry containing said cerium oxide powder as an abrasive.

6 Claims, 4 Drawing Sheets

Drawings

CERIUM CARBONATE POWDER, CERIUM OXIDE POWDER, METHOD FOR PREPARING THE SAME, AND CMP SLURRY COMPRISING THE SAME

This application claims the benefit of the filing date of Korean Patent Application No. 2005-108721, filed on Nov. 14, 2005, in the Korean Intellectual Property Office, the disclosure of which is incorporated herein in its entirety by reference.

TECHNICAL FIELD

The present invention relates to cerium carbonate powder, cerium oxide powder, preparation methods thereof, and a CMP slurry comprising said cerium oxide powder.

BACKGROUND ART

Cerium oxide powder is a highly functional ceramic material that is widely used in abrasives, catalysts, phosphors and the like. Recently, it has been widely used as an abrasive for a chemical mechanical polishing for the selective planarization of semiconductor substrates. General methods for preparing such cerium oxide powder include a vapor-phase process, a solid-phase process, a liquid-phase method, and the like.

Methods of preparing cerium oxide powder through the vapor-phase process are methods of directly preparing cerium oxide powder by vaporizing a cerium precursor and then reacting the vaporized material with oxygen or the like. These methods include a decomposition method by flame combustion, a decomposition method by gas condensation, a plasma decomposition method, a laser vaporization method, and the like. However, these methods have a problem in that it is difficult to prepare cerium oxide powder in large scale because cerium salt precursor and equipment need high cost.

Methods of preparing cerium oxide powder through the solid-phase process comprise calcining process of the raw material of cerium oxide, such as carbonate, sulfate, oxalate or the like. International Patent Publication Nos. WO 1998/14987 and WO 1999/31195 disclose cerium oxide abrasives for polishing silicon oxide insulating films, which are prepared by calcining cerium carbonate powder having large particle size in an oxygen atmosphere to prepare cerium oxide powder having a size of 30-100 µm, and then controlling the particle size of cerium oxide by dry milling and wet milling processes. However, these methods have problems in that cerium oxide powder having large particle size remains even after the milling processes, making it difficult to control the particle size of cerium oxide, and thus a filtration process using a filter should be additionally carried out for a long period of time, even after a CMP slurry is finally prepared.

Methods of preparing cerium oxide powder through the liquid-phase process are methods of preparing cerium oxide powder directly from a starting material of trivalent or tetravalent cerium salt by adding a pH modifier such as ammonia. These methods include a precipitation method and a hydrothermal synthesis method, and studies thereon are being actively conducted, because relatively low raw material cost and equipment cost are incurred. However, the reaction between starting materials used in the preparation of cerium oxide easily occurs from a nucleation step, making it difficult to control particle growth. Also, when cerium oxide powder prepared through the liquid-phase process is used for polishing, it will have low polishing rate.

DISCLOSURE OF THE INVENTION

The present inventors have conducted studies to develop cerium oxide powder, which has uniform particle size and shape and is suitable for chemical mechanical polishing and, as a result, found that, when cerium oxide powder is prepared through a solid-phase reaction by calcination, the size, shape and crystal structure of cerium oxide powder as a product are influenced by the size, shape and crystal structure of cerium carbonate as a raw material.

Also, the present inventors have found that, when cerium carbonate powder is prepared through the liquid-phase process, the particle characteristics of cerium carbonate powder can be controlled by controlling the concentration of reaction materials, the concentration ratio therebetween, the kind of additives, and the like.

Thus, the present inventors have found that, when cerium oxide powder prepared from a cerium carbonate raw material having controlled particle characteristics as described above is used as an abrasive, it can be controlled to the desired particle size during the preparation of CMP slurry without the need to conduct a milling process for a long time, can show high polishing rate and selectivity in a CMP process, and also does not cause the problem of micro-scratches.

Accordingly, it is an object of the present invention to provide cerium carbonate powder having controlled particle size, particle shape and crystal structure, cerium oxide powder prepared therefrom, preparation methods thereof, and a CMP slurry comprising said cerium oxide powder.

According to one aspect of the present invention, there is provided a method of preparing cerium carbonate powder by mixing a cerium precursor aqueous solution with a carbonate precursor aqueous solution and subjecting the mixture solution to a precipitation reaction, wherein the concentration of cerium in the cerium precursor aqueous solution ranges from 1M to 10M, the molar concentration ratio of the cerium precursor to the carbonate precursor ranges from 1:1 to 1:7, and the cerium precursor aqueous solution contains at least one additive selected from the group consisting of carbonate compounds, acrylic compounds, and sulfate ion-containing compounds.

According to another aspect of the present invention, there is provided cerium carbonate powder, which has an orthorhombic crystal structure, a particle size of 0.05 to 1 µm, and an aspect ratio of 1 to 5.

According to still another aspect of the present invention, there is provided a method of preparing cerium oxide using the above-described cerium carbonate powder as a raw material.

According to yet still another aspect of the present invention, there is provided cerium oxide powder, which has a cubic crystal structure, a particle size of 0.05 to 1 µm, and an aspect ratio of 1 to 5.

According to still further another aspect of the present invention, there is provided a CMP slurry comprising the above-described cerium oxide powder as an abrasive.

Hereinafter, the present invention will be described in detail.

When cerium oxide powder is prepared by calcining cerium carbonate powder, the particle size and shape of the cerium carbonate powder tend to be maintained in the cerium oxide powder with little or no change. Prior cerium oxide abrasives for use in CMP slurry have mostly been prepared from cerium carbonate powder having an average particle size ranging from a few µm to a few tens of µm, the average particle size of the cerium oxide powder abrasives was also a level of a few µm to a few tens of µm.

To use such large-particle-size cerium oxide powder in CMP applications, it should be subjected to a long-term milling process or several repeated millings (in the case of a continuous mill such as an AFEX mill) and filtration processes in order to be able to be controlled to the desired particle size level, resulting in the loss of energy, money and time.

However, in the present invention, the particle size and shape of cerium oxide powder for use as an abrasive can be controlled to desired levels by controlling the particle size and shape of cerium carbonate powder in the preparation step of the cerium carbonate powder, in view of the phenomenon that the particle size and shape of the cerium carbonate are maintained in cerium oxide powder after calcination.

Thus, according to the present invention, the milling and filtering processes in the preparation of a CMP slurry containing cerium oxide as an abrasive can be simplified, resulting in a reduction in cost and an increase in productivity. Also, the generation of inferior products caused by micro-scratches can be suppressed by fundamentally eliminating large particles, which cause scratches on wafer surfaces. In addition, the particle size and shape of the abrasive can be easily controlled to desired levels to increase the polishing rate and selectivity thereof.

According to the present invention, in the preparation step of cerium oxide powder by a precipitation reaction, the concentration of the cerium precursor, the concentration ratio of the cerium precursor to the carbonate precursor, the kind of additives, etc., can be controlled in order to control the particle size and shape of the resultant cerium carbonate powder as the precursor of cerium oxide powder.

In the process of allowing the cerium precursor solution to react with the carbonate precursor solution to precipitate cerium carbonate, the concentration of cerium in the cerium precursor solution, and the molar concentration ratio of the cerium precursor to the carbonate precursor, act as main factors that control the nucleation and crystal growth of cerium carbonate powder to determine the particle size of the powder. For example, the concentration of the cerium precursor as a raw material is maintained at a constant level in the initial reaction stage, and is rapidly decreased when cerium carbonate powder as a product starts to be precipitated. In this case, if the concentration of the cerium precursor as a raw material is low, crystal growth after nucleation will be insufficient. On the other hand, if the concentration of the cerium precursor is high, non-uniform nucleation and crystal growth will occur, so that the particle size of the resultant powder will be non-uniform and the particle size distribution thereof will widen.

Thus, in order to obtain cerium carbonate powder having a uniform particle size of 0.05-1 μm, it is preferable that the concentration of cerium in the cerium precursor solution be in the range of 1-10 M, and the molar concentration ratio of the cerium precursor and the carbonate precursor be in 1:1 to 1:7.

If the concentration of the cerium precursor is lower than 1M, the concentration of the cerium precursor will be decreased before sufficient crystal growth following nucleation during the reaction occurs, and thus crystal growth will no longer occur. On the other hand, if the concentration of the cerium precursor is higher than 10 M, non-uniform precipitation will occur, resulting in cerium carbonate powder having wide particle size distribution and non-uniform particle size.

In the present invention, the particle size of powder is a value measured using a particle size analyzer (e.g., a laser-scattering system) known to those skilled in the art. Even in the case of powder particles having large aspect ratio (e.g., cylindrical or rod shapes), the particle size is expressed as a value converted into the diameter of spherical particles having a volume equivalent thereto.

Meanwhile, the shape of precipitated cerium carbonate can be uniformly controlled by adding additives, such as carbonate compounds, acrylic compounds, or sulfate ion-containing compounds, to the cerium precursor solution.

When prior cerium carbonate powder had an orthorhombic crystal structure, it generally had a rod shape, i.e., large aspect ratio. Accordingly, cerium oxide powder obtained by calcining such cerium carbonate powder as a precursor likewise had a rod shape or plate shape, and thus when said cerium oxide powder was used as an abrasive in CMP slurry, it was impossible to avoid the phenomenon of micro-scratches occurring on polished surfaces. However, the orthorhombic cerium carbonate needs low production cost, and thus is considered to be advantageous in terms of mass production. Accordingly, there is a need to develop a process for preparing cerium oxide powder for abrasives using the orthorhombic cerium carbonate.

Particularly, a process of preparing cerium carbonate at less than 100° C. under atmospheric pressure using water as a solvent and urea as a carbonate precursor is easy to apply industrially, but has a problem in that cerium carbonate having an orthorhombic crystal structure, a large aspect ratio of more than 5 and a large particle size of a few μm is obtained.

In the present invention, when said additive is used in the precipitation reaction of cerium carbonate, cerium carbonate powder close to a spherical or cubic shape having an aspect ratio of 1-5 can be obtained, even though the powder has an orthorhombic crystal structure. Thus, cerium oxide powder obtained by calcining such cerium carbonate as a precursor also has a shape close to a spherical or cubic shape.

Said additive serves to promote the growth of a specific crystal plane by controlling the surface energy of cerium carbonate as a product or to adsorb onto a specific crystal plane to interfere with the growth of the crystal plane so as to control the shape of particles. Also, it enables the uniformity between particles to be ensured.

Non-limiting examples of said additive include itaconic acid and ammonium sulfate.

Itaconic acid serves to reduce the aspect ratio of powder by interfering with the needle-like growth of powder crystals, and ammonium sulfate can induce the uniform agglomeration between powders. Particularly, the use of ammonium sulfate together with itaconic acid is more preferable, because it can more effectively reduce the aspect ratio of powder.

Said additive can be used in an amount of 0.05-2 parts by weight based on 100 parts by weight of the cerium precursor. If the additive is used in an amount of less than 0.05 parts by weight, it will have a reduced effect on the growth of particles, and if it is used in an amount of more than 2 parts by weight, it will not influence the growth of particles or can rather deteriorate the dispersion stability of particles.

In the present invention, as the cerium precursor, cerium nitrate, cerium acetate or the like can be used, and as the carbonate precursor, urea or the like can be used, but the present invention is not limited to said substances.

In the present invention, as a solvent for dissolving the cerium precursor and the carbonate precursor, water can be used, but the present invention is not limited thereto.

The reaction of precipitating cerium carbonate powder by mixing the cerium precursor solution with the carbonate precursor solution can be carried out at a temperature of 80-100° C. for 2-60 hours.

The temperature of the precipitation reaction can influence the yield and crystallinity of powder, and the time of the precipitation reaction can influence the yield of powder.

The cerium carbonate powder prepared through the precipitation reaction according to the present invention can have an orthorhombic crystal structure, a particle size of 0.05-1 μm, and an aspect ratio of 1-5.

Meanwhile, the inventive cerium oxide powder can be prepared from the above-described cerium carbonate powder as a precursor, and particularly, can be prepared through a solid-phase reaction by calcining said cerium carbonate powder. The calcination process can be carried out at a temperature of 300-900° C. for 10-60 minutes.

The cerium oxide powder prepared by this calcination process can have a particle size and shape, which are the same as or similar to those of cerium carbonate powder used as a precursor. Meanwhile, even if the crystal structure of cerium carbonate powder is orthorhombic, the crystal structure can be changed to a cubic structure when the cerium carbonate powder is cancined to prepare cerium oxide powder.

Thus, the cerium oxide powder of the present invention may have a cubic structure, an average particle size of 0.05-1 μm, and an aspect ratio of 1-5.

Meanwhile, the CMP slurry of the present invention can contain the above-described cerium oxide powder as an abrasive, and other additives, such as a dispersant, known to those skilled in the art.

Said dispersant may be a non-ionic polymer dispersant or anionic polymer dispersant. The non-ionic polymer dispersant can be one or more selected from the group consisting of polyvinyl alcohol (PAA), ethylene glycol (EG), glycerin, polyethylene glycol (PEG), polypropylene glycol (PPG) and polyvinyl pyrrolidone (PVP), and the anionic polymer dispersant can be one or more selected from the group consisting of polyacrylic acid, ammonium polyacrylate and polyacrylic maleic acid. However, the scope of the present invention is not limited to the above examples of dispersants.

The dispersant can be used in amounts of 0.001-10 parts by weight, and preferably 0.02-3.0 parts by weight, based on 100 parts by weight of an abrasive containing cerium oxide powder. If the dispersant is used in an amount less than 0.001 parts by weight, rapid precipitation will occur due to low dispersibility, so that the abrasive cannot be supplied uniformly due to the precipitation occurring during transport of the abrasive slurry. On the other hand, if the dispersant is used in an amount greater than 10 parts by weight, a dispersant polymer layer functioning as a cushioning layer may be formed thick around the abrasive particles, thereby making it difficult to allow the surface of the abrasive to be brought into contact with a polishing surface of silica, resulting in a drop in the polishing rate.

In a preferred embodiment, the CMP slurry is obtained by mixing cerium oxide powder with a dispersant in water and adjusting the pH of the mixture to 6-8. For the pH adjustment, 1N KOH, 1N $HNO_3$, etc., may be used.

After the completion of the pH adjustment, the CMP slurry is preferably subjected to a dispersion stabilization step in order to improve the dispersion and storage stability thereof. The dispersion stabilization step may be performed using dispersion system APEX mill (Kotobuki eng. & mfg. Co., Japan), according to a method known to those skilled in the art. With regard to the APEX mill conditions in the dispersion stabilization step, zirconia beads having a size of 0.01-1 mm are used, cerium oxide slurry is introduced into the mill by means of a pump at a rate of 10-1000 ml/min., and the mixture can be 1-20 times passed through the mill at a speed of 2000-5000 rpm. The APEX mill is a kind of continuous mill, comprises a plurality of rod-type baffles in a tube having a constant length, and performs milling at a high rotational speed using beads charged therein. The CMP slurry can be continuously milled, because it introduced into one end of the pipe, milled with passage through the pipe, and discharged through the other end of the pipe. One passage through the mill is defined as "1 pass".

Through the milling process, the cerium oxide powder in the CMP slurry can have a particle size distribution of 0.01-0.45 μm. If the particle size of the cerium oxide powder is smaller than 0.01 μm, the powder cannot perform sufficient polishing, and if the particle size is larger than 0.45 μm, the powder can cause scratches.

MODE FOR CARRYING OUT THE INVENTION

Figure 1:
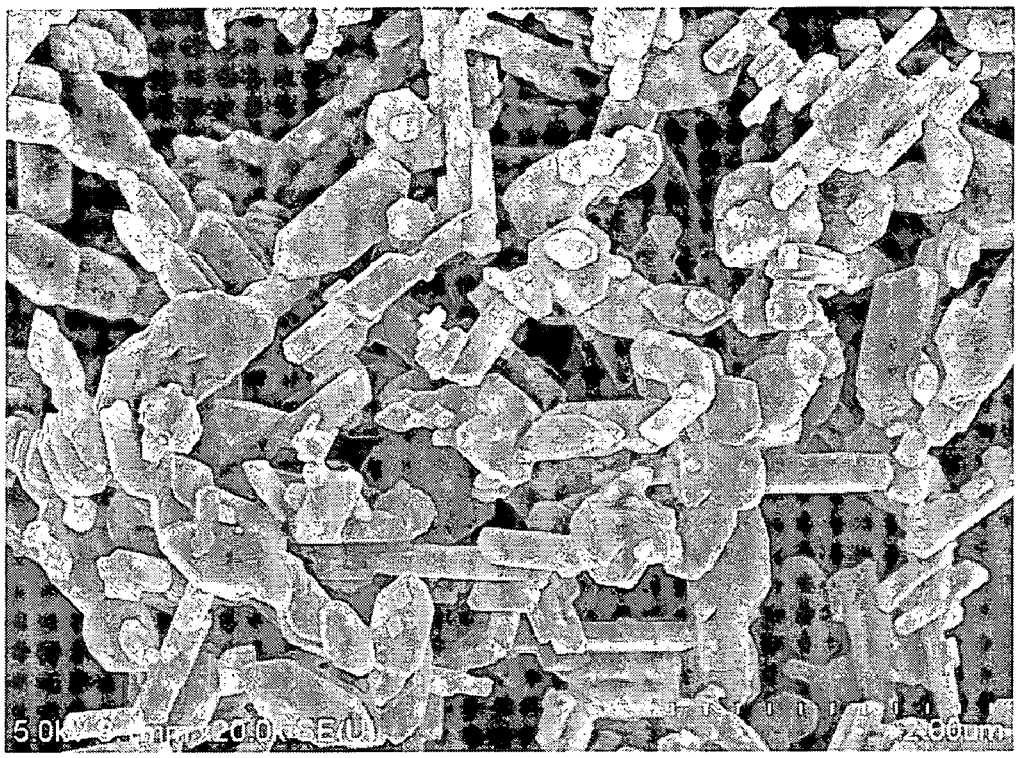
FIG. 1 is a SEM photograph of orthorhombic cerium carbonate according to Example 1.
Figure 2:
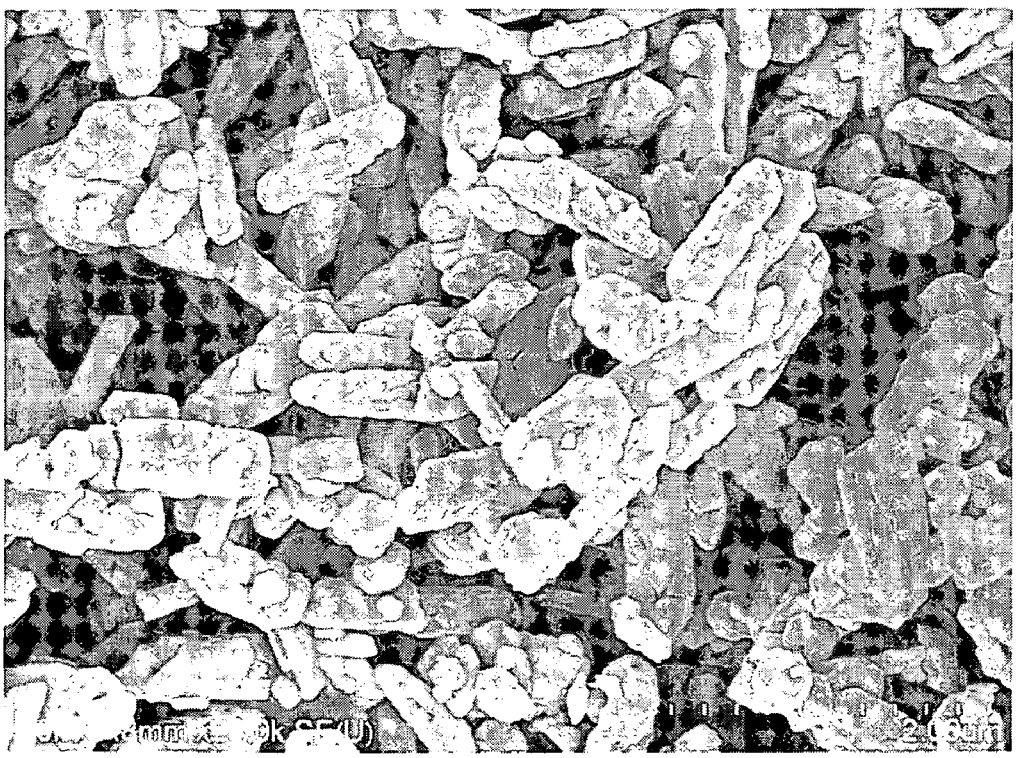
FIG. 2 is a SEM photograph of cubic cerium oxide according to Example 1.
Figure 3:
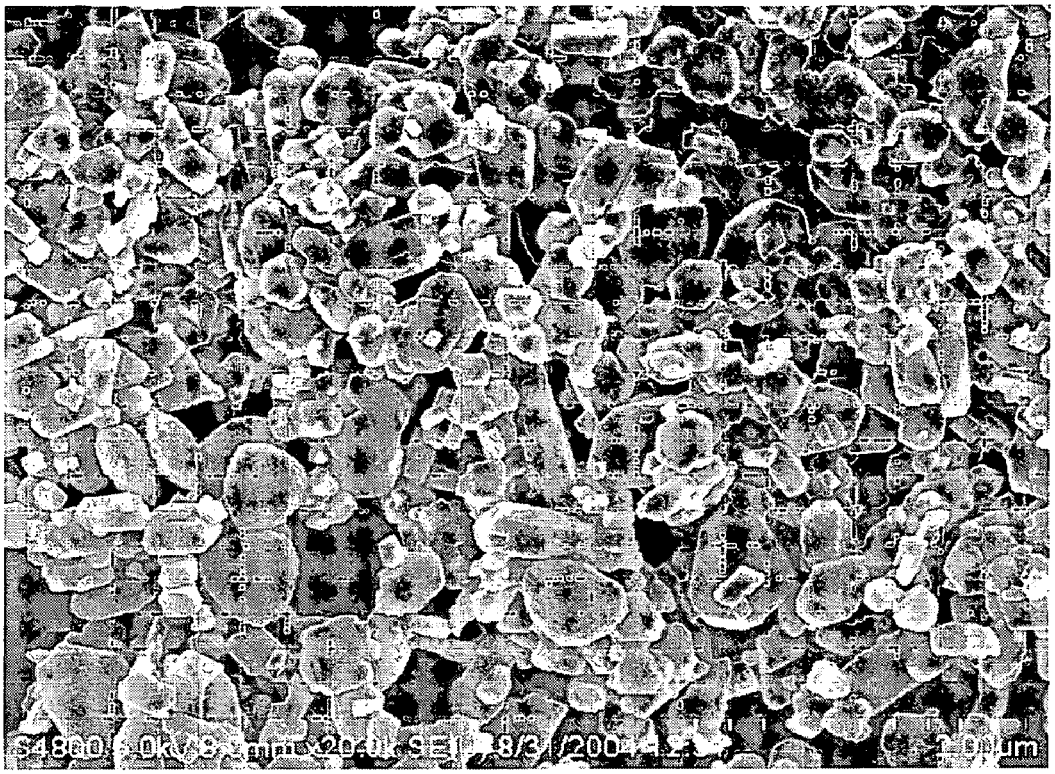
FIG. 3 is a SEM photograph of orthorhombic cerium carbonate according to Example 2.
Figure 4:
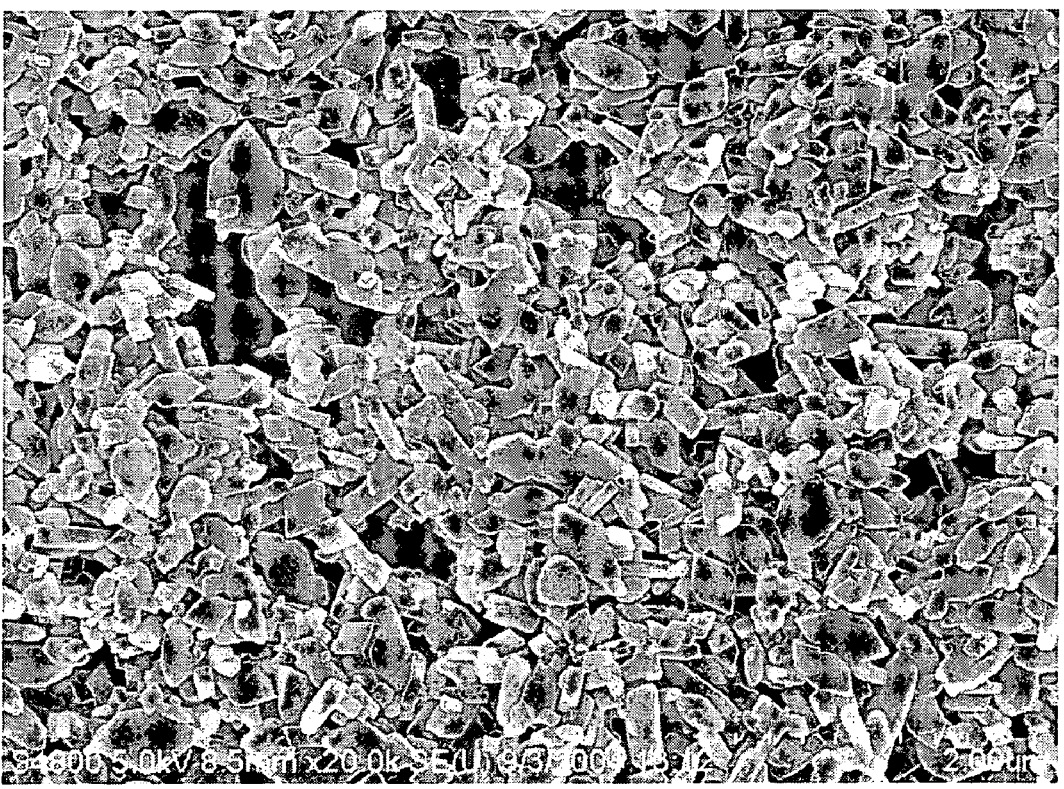
FIG. 4 is a SEM photograph of orthorhombic cerium carbonate according to Example 3.
Figure 5:
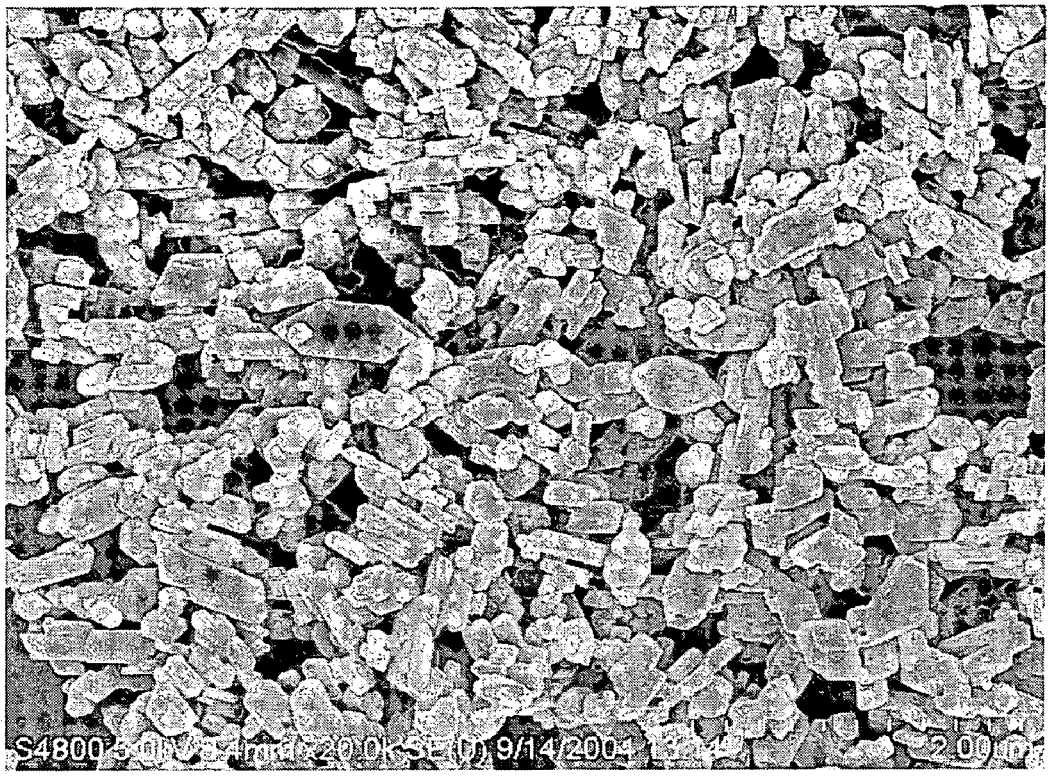
FIG. 5 is a SEM photograph of orthorhombic cerium carbonate according to Example 4.
Figure 6:
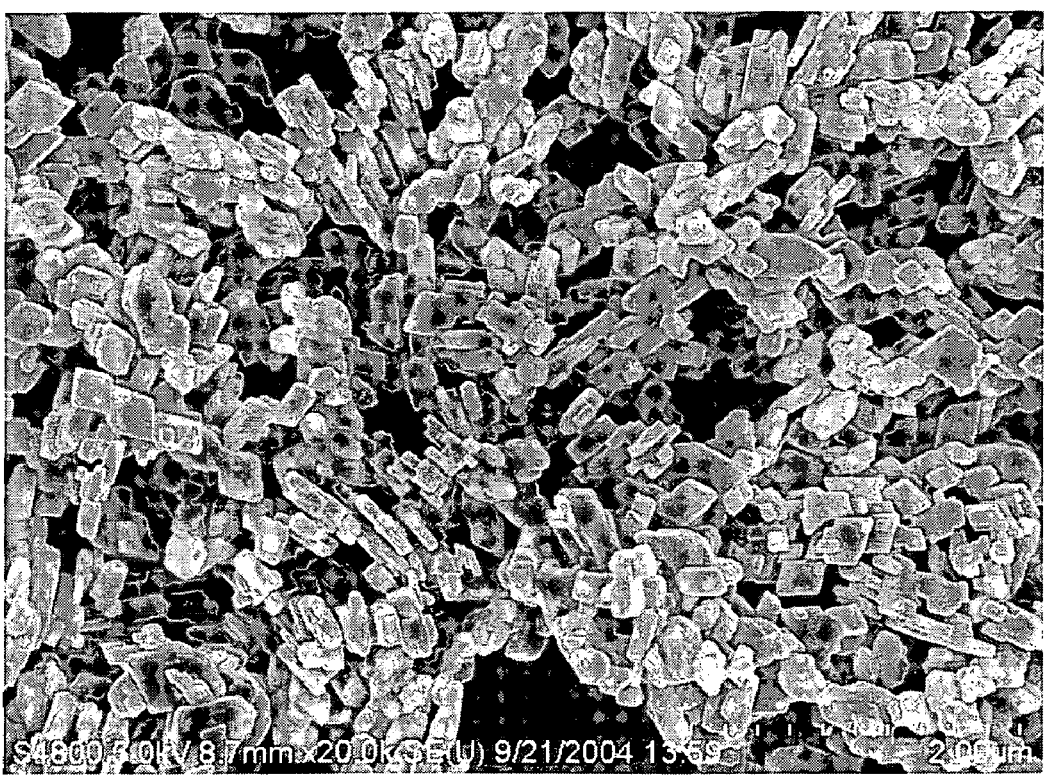
FIG. 6 is a SEM photograph of orthorhombic cerium carbonate according to Example 5.
Figure 7:
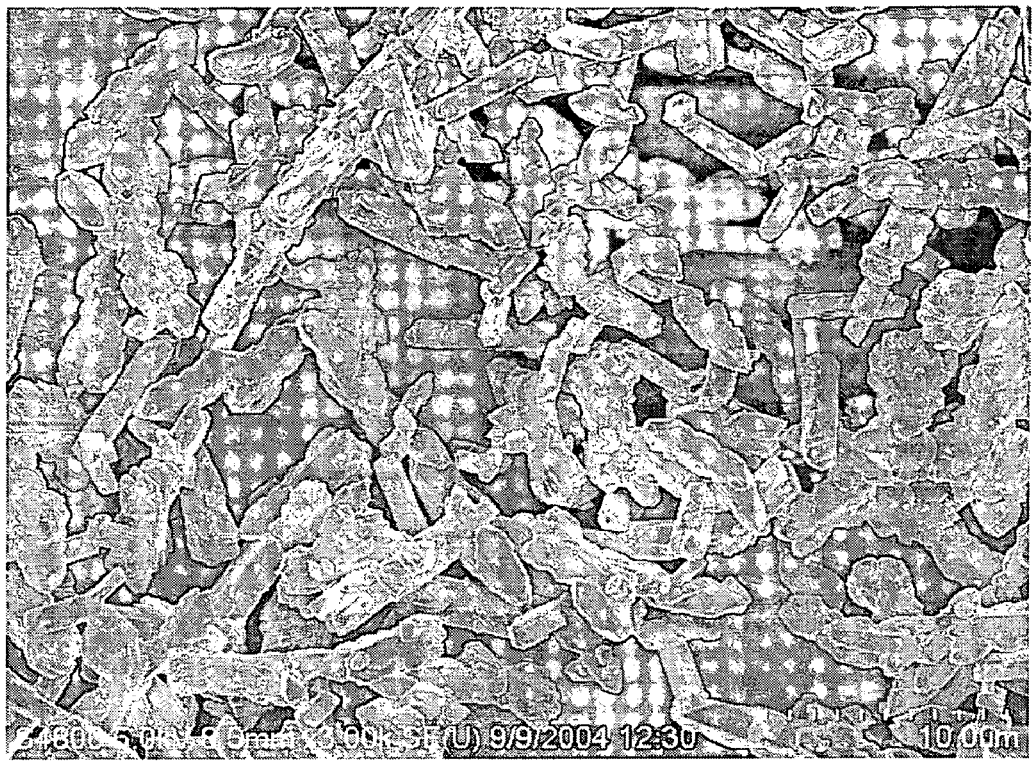
FIG. 7 is a SEM photograph of orthorhombic cerium carbonate according to Comparative Example 1.
Figure 8:
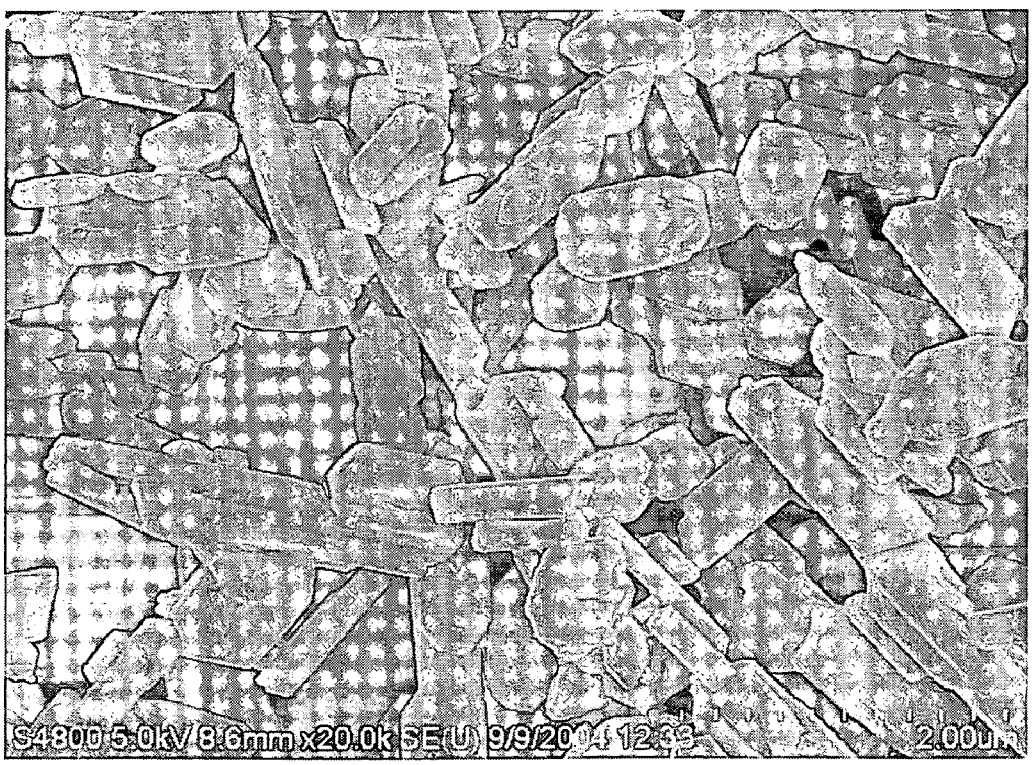
FIG. 8 is a SEM photograph of orthorhombic cerium carbonate according to Comparative Example 2.

Hereinafter, the present invention will be described in further detail with reference to examples. It is to be understood, however, that these examples are illustrative only, and the scope of the present invention is not limited thereto.

Example 1

Preparations of Cerium Carbonate Powder and Cerium Oxide Powder 0.3 mol of cerium nitrate was dissolved in 100 ml of distilled water, and 0.9 mol of urea was dissolved in 100 ml of distilled water. The two solutions were mixed with each other in a 500-ml precipitation reactor. The mixture solution was subjected to a precipitation reaction at 96° C. for 20 hours while it was agitated at a speed of 200 rpm, thus obtaining cerium carbonate powder.

The particle size of the powder was analyzed using a particle size distribution measurement apparatus (Horiba LA-910), and the crystal phase thereof was analyzed using XRD.

The obtained cerium carbonate powder had a particle size of about 0.3-1.1 μm, and the crystal structure thereof was orthorhombic.

The cerium carbonate powder was heat-treated at 700° C. for 2 hours, thus obtaining cerium oxide powder. The powder after the heat-treatment showed a reduction of about 20% in weight compared to the powder before the heat-treatment, and had a particle size distribution of about 0.3-1.1 μm, and a medial particle size of 0.74 μm. The results of XRD analysis of the heat-treated powder showed that the powder was a cerium oxide crystal. Also, the crystallinity of the powder was analyzed by the Scherrer Equation using the half-width of the main peak thereof, and the analysis results showed that the powder had a crystallite size of 35.8 nm.

Preparation of CMP Slurry 0.1 kg of the above-prepared cerium oxide powder, 0.9 kg of ultra-pure water and 2 parts by weight, based on 100 parts by weight of the cerium oxide power, of a dispersant, were mixed with each other to prepare a cerium oxide dispersion. As the dispersant, a polyacrylic acid dispersant (Aldrich, Mw2000) was added. The prepared cerium oxide dispersion was adjusted to pH 7.5 with ammonia water, and then subjected to a step of improving dispersion stabilization and controlling particle size using an AFEX mill. Herein, the AFEX mill conditions were as follows: zirconia beads having a size of 0.1 mm were used in the mill, the transfer rate of the dispersion was 400 ml/min, the dispersion was passed 8 times through the mill at a speed of 4250 rpm, and the average particle size of the cerium oxide powder was adjusted to 0.186 μm. Ultra-pure water was added to the dispersion such that the content of the abrasive particles in the dispersion was 2% by weight.

Measurement of Polishing Performance

As a CMP polishing system, POLI-400 (G&P Technology Co., Ltd., Korea) for 5-inch wafer polishing was used, and as a target wafer, a 5-inch blanket wafer applied with a PECVD (Plasma Enhanced Chemical Vapor Deposition) oxide film and nitride film was used. The wafer was attached to the head of the CMP polishing system, and the prepared CMP slurry was added dropwise to a platen having a polyurethane polishing pad attached thereto, at a rate of 100 ml of minute, while the wafer was polished for 1 minute. At this time, the head was pressed against the platen at a pressure of 280 g/cm$^2$, each of the head and the platen was rotated at a speed of 90 rpm for the polishing step. After completion of the polishing step, the wafer was washed clean, and the film thickness thereof was measured using a wafer film-thickness measurement device (Nanospec 6100, Nanometric Co., USA). The measurement results showed that the polishing rate of the oxide film was 2769 Å/min, and the polishing rate of the nitride film was 70 Å/min. Also, the results of observation with an optical microscope showed that the wafer had no micro-scratches.

Example 2

Preparations of Cerium Carbonate Powder and Cerium Oxide Powder

Cerium carbonate powder and cerium oxide powder were prepared in the same manner as in Example 1, except that cerium nitrate was used in an amount of 0.5 mol, and urea was used in an amount of 1.5 mol.

The size of the resultant cerium carbonate was about 0.05-0.45 μm, and the crystal structure thereof was orthorhombic.

Also, it was analyzed that the cerium oxide powder obtained after heat-treatment showed a reduction of about 20% in weight, and had a particle size distribution of about 0.05-0.45 μm with a median particle size of 0.36 μm. XRD analysis results showed that the heat-treated powder was a cerium oxide crystal and had a crystallite size of 35.8 nm.

Preparation of CMP Slurry and Measurement of Polishing Performance

The preparation of CMP slurry and the measurement of polishing performance were carried out in the same manner as in Example 1, except that the cerium oxide powder prepared in Example 2 was used, and the dispersion was passed three times through the AFEX mill at a speed of 4250 rpm to adjust the average particle size to 0.172 μm.

As a result, it was analyzed that the oxide film polishing rate was 2801 Å/min, and the nitride film polishing rate was 69 Å/min. Also, the results of observation with an optical microscope showed that the wafer had no micro-scratches.

Example 3

Preparation of Cerium Carbonate and Cerium Oxide Powder

Cerium carbonate powder and cerium oxide powder were prepared in the same manner as in Example 1, except that cerium nitrate was used in an amount of 0.7 mol, and urea was used in an amount of 2.1 mol.

The size of the resultant cerium carbonate powder was about 0.02-0.45 μm, and the crystal structure thereof was orthorhombic.

Also, it was analyzed that the cerium oxide powder obtained after heat-treatment showed a reduction of about 20% in weight, and had a particle size distribution of about 0.20-0.43 μm with a median particle size of 0.22 μm. XRD analysis results showed that the heat-treated powder was a cerium oxide crystal and had a crystallite size of 38.2 nm.

Preparation of CMP Slurry and Measurement of Polishing Performance

The preparation of CMP slurry and the measurement of polishing performance were carried out in the same manner as in Example 1, except that the cerium oxide powder prepared in Example 3 was used, and the dispersion was passed one time through the AFEX mill at a speed of 4250 rpm to adjust the average particle size to 0.189 μm.

As a result, it was analyzed that the oxide film polishing rate was 2834 Å/min, and the nitride film polishing rate was 69 Å/min. Also, the results of observation with an optical microscope showed that the wafer had no micro-scratches.

Example 4

Preparations of Cerium Carbonate Powder and Cerium Oxide Powder

Cerium carbonate powder and cerium oxide powder were prepared in the manner as in Example 1, except that itaconic acid (Samjun Co., 99.5% purity) was added to the cerium nitrate solution in an amount of 0.3 parts by weight based on 100 parts by weight of cerium nitrate.

The size of the resultant cerium carbonate powder was about 0.11-0.42 μm, and the crystal structure thereof was orthorhombic.

Also, it was analyzed that the cerium oxide powder obtained after heat-treatment showed a reduction of about 20% in weight, and had a particle size distribution of about 0.11-0.42 μm with a median particle size of 0.23 μm. XRD analysis results showed that the heat-treated powder was a cerium oxide crystal and had a crystallite size of 37.4 nm.

Preparation of CMP Slurry and Measurement of Polishing Performance

The preparation of CMP slurry and the measurement of polishing performance were carried out in the same manner as in Example 1, except that the cerium oxide powder prepared in Example 4 was used, and the dispersion was passed one time through the AFEX mill at a speed of 4250 rpm to adjust the average particle size to 0.164 μm.

As a result, it was analyzed that the oxide film polishing rate was 2803 Å/min, and the nitride film polishing rate was 70 Å/min. Also, the results of observation with an optical microscope showed that the wafer had no micro-scratches.

Example 5

Preparations of Cerium Carbonate Powder and Cerium Oxide Powder

Cerium carbonate powder and cerium oxide powder were prepared in the manner as in Example 2, except that each of itaconic acid (Samjun Co., 99.5% purity) and ammonium sulfate (Duksan Co., 99.5% purity) was added to the cerium nitrate solution in an amount of 0.3 parts by weight based on 100 parts by weight of cerium nitrate.

The size of the resultant cerium carbonate powder was about 0.16-0.44 µm, and the crystal structure thereof was orthorhombic.

Also, it was analyzed that the cerium oxide powder obtained after heat-treatment showed a reduction of about 20% in weight, and had a particle size distribution of about 0.16-0.44 µm with a median particle size of 0.24 µm. XRD analysis results showed that the heat-treated powder was a cerium oxide crystal and had a crystallite size of 39.1 nm.

Preparation of CMP Slurry and Measurement of Polishing Performance

The preparation of CMP slurry and the measurement of polishing performance were carried out in the same manner as in Example 1, except that the cerium oxide powder prepared in Example 5 was used, and the dispersion was passed one time through the AFEX mill at a speed of 4250 rpm to adjust the average particle size to 0.173 µm.

As a result, it was analyzed that the oxide film removal rate was 2844 Å/min, and the nitride film removal rate was 70 Å/min. Also, the results of observation with an optical microscope showed that the wafer had no micro-scratches.

Comparative Example 1

Preparation of Cerium Oxide Powder

Cerium oxide powder was prepared in the same manner as in Example 1, except that commercial cerium carbonate powder (Sineng Co., Ltd., China) having an orthorhombic crystal structure was used after drying in a drying oven at 100° C. for 24 hours.

The cerium oxide powder obtained after heat-treatment showed a reduction of about 20% in weight, and had an average particle size of 10 µm. XRD analysis results showed that the heat-treated powder was a cerium oxide crystal and had a crystallite size of 40.2 nm.

Preparation of CMP Slurry and Measurement of Polishing Performance

The preparation of CMP slurry and them measurement of polishing performance were carried out in the same manner as in Example 1, except that the cerium oxide powder prepared in Comparative Example 1 was used, and the dispersion was passed 30 times through the AFEX mill at a speed of 4250 rpm to adjust the average particle size to 0.247 µm.

As a result, it was analyzed that the oxide film polishing rate was 2971 Å/min, and the nitride film polishing rate was 90 Å/min. Also, the results of observation with an optical microscope showed that the wafer had micro-scratches.

Comparative Example 2

Preparation of cerium Oxide Powder

Cerium carbonate powder and cerium oxide powder were prepared in the same manner as in Example 1, except that cerium nitrate was used in an amount of 0.05 mol, and urea was used in an amount of 0.15 mol.

The crystal structure of the resultant cerium oxide was orthorhombic.

The cerium oxide powder obtained after heat-treatment showed a reduction of about 20% in weight, and had an average particle size of about 10 µm. XRD analysis results showed that the heat-treated powder was a cerium oxide crystal and had a crystallite size of 42.4 nm.

Preparation of CMP Slurry and Measurement of Polishing Performance

The preparation of CMP slurry and the measurement of polishing performance were carried out in the same manner as in Example 1, except that the cerium oxide powder prepared in Comparative Example 2 was used, and the dispersion was passed 30 times through the AFEX mill at a speed of 4250 rpm to adjust the average particle size to 0.259 µm.

As a result, it was analyzed that the oxide film polishing rate was 2862 Å/min, and the nitride film polishing rate was 86 Å/min. Also, the results of observation with an optical microscope showed that the wafer had micro-scratches.

The particle diameter, polishing rate and selectivity of the CMP slurries prepared in Examples 1-5 and Comparative Examples 1 and 2 are shown in Table 1 below.

TABLE 1

| CMP slurry | Crystallite size (nm) | Average particle size (nm) of abrasive | Material removal rate (Å/min) | | Selectivity | Micro-scratch |
|---|---|---|---|---|---|---|
| | | | Oxide film | Nitride film | | |
| Example 1 | 35.8 | 186 | 2769 | 70 | 40 | No |
| Example 2 | 36.5 | 172 | 2801 | 69 | 41 | No |
| Example 3 | 38.2 | 189 | 2834 | 69 | 41 | No |
| Example 4 | 37.4 | 164 | 2803 | 70 | 40 | No |
| Example 5 | 39.1 | 173 | 2844 | 70 | 41 | No |
| Comparative Example 1 | 40.2 | 247 | 2971 | 90 | 33 | Yes |
| Comparative Example 1 | 42.4 | 259 | 2862 | 86 | 33 | Yes |

In Table 1 above, the average particle size of abrasive means a value adjusted to a suitable particle size to a polishing by AFEX milling. As can be seen in Table 1, in the case of Examples 1-5, the powder could be adjusted to an average particle size of 164-189 nm when the CMP slurry was passed 1-8 times passed through the APEX mill, whereas in the case of Comparative Examples 1 and 2, it was difficult to adjust the powder to an average particle size smaller than 247-259 nm even when the CMP slurry was passed 30 times through the APEX mill. Also, in the case of Comparative Examples 1 and 2, micro-scratches occurred on the polished surfaces after polishing, because the abrasive particles were milled several times to make the shape of the particles rough.

In addition, the reason why the selectivity of Examples 1-5 was better than that of Comparative Examples 1 and 2 are thought to be because the average particle size of the abrasives of Examples 1-5 was smaller than that of Comparative Examples 1 and 2, leading to a reduction in the nitride film removal rate.

INDUSTRIAL APPLICABILITY

As can be seen from the foregoing, according to the present invention, cerium carbonate powder having a uniform particle size of 0.05-1 μm can be prepared through the liquid-phase process by controlling the concentration of the cerium precursor solution, the molar concentration ratio of the cerium precursor to the carbonate precursor solution, the kind of additives, and the like. Also, the cerium carbonate powder is enabled to have a uniform shape with an aspect ratio of 1-5, even though it has an orthorhombic crystal structure.

Accordingly, cerium oxide powder obtained by calcining said cerium carbonate powder as a precursor is enabled to have a particle size and shape similar to those of said cerium carbonate powder. Thus, when the cerium oxide powder is used as an abrasive, it can be controlled to the desired particle size during the preparation of CMP slurry without the need to carry out a milling process for a long time, leading to a reduction in cost and an increase in productivity. Also, it can show high polishing rate and selectivity and, at the same time, does not cause micro-scratches on polishing surfaces.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A method of preparing cerium carbonate powder by mixing a cerium precursor aqueous solution with a carbonate precursor aqueous solution and subjecting the mixture solution to a precipitation reaction,
   wherein the concentration of cerium in the cerium precursor aqueous solution ranges from 1M to 10M,
   the molar concentration ratio of the cerium precursor to the carbonate precursor ranges from 1:1 to 1:7, and
   the cerium precursor aqueous solution contains at least one additive selected from the group consisting of itaconic acid and ammonium sulfate.

2. The method according to claim 1, wherein the additive is used in an amount of 0.05 to 2 parts by weight based on 100 parts by weight of the cerium precursor.

3. The method according to claim 1, wherein the cerium precursor is cerium nitrate or cerium acetate.

4. The method according to claim 1, wherein the carbonate precursor is urea.

5. The method according to claim 1, wherein the cerium carbonate has an orthorhombic crystal structure.

6. The method according to claim 1, wherein the cerium carbonate has an average particle size of 0.05 to 1 μm and an aspect ratio of 1 to 5.

* * * * *